L. LINDEN.
APPARATUS FOR PURIFYING SEWAGE OR ANY OTHER LIQUID.
APPLICATION FILED JAN. 30, 1914.
1,162,624.
Patented Nov. 30, 1915.
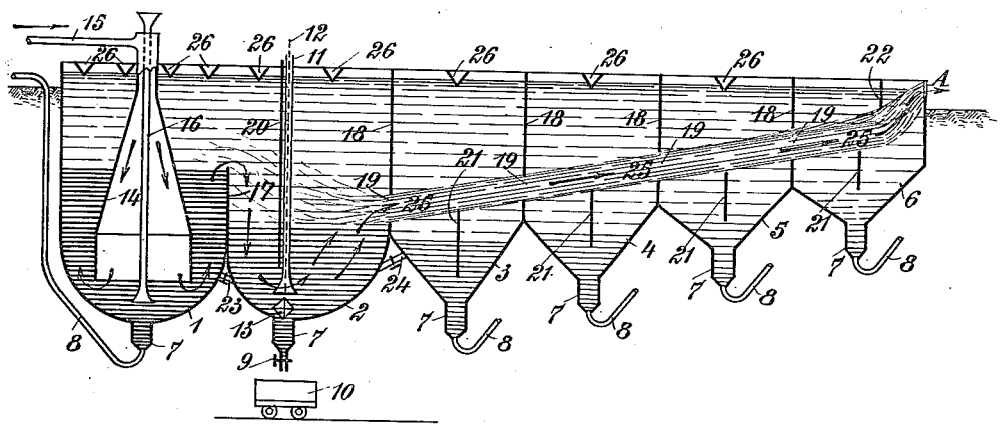
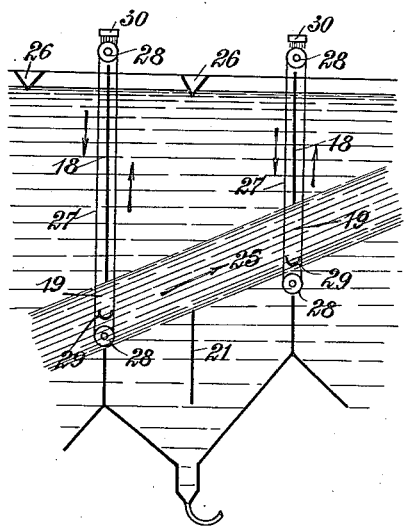
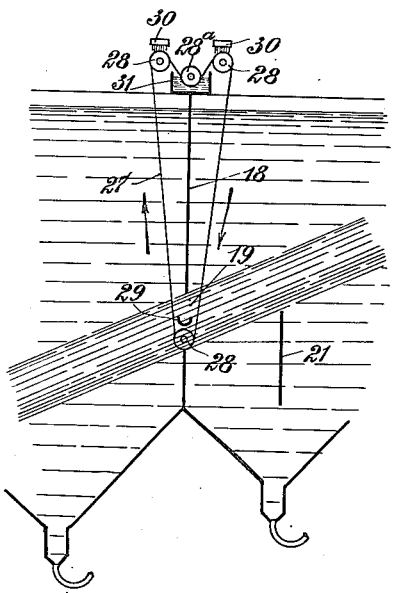
WITNESSES
Frank H. Logan
John N. Hovey
INVENTOR
LUCIEN LINDEN
BY H. van Oldenneel
ATTORNEY

UNITED STATES PATENT OFFICE.

LUCIEN LINDEN, OF BRUSSELS, BELGIUM, ASSIGNOR TO WILLIAM J. STEWART, OF BELFAST, IRELAND.

APPARATUS FOR PURIFYING SEWAGE OR ANY OTHER LIQUID.

1,162,624.          Specification of Letters Patent.      Patented Nov. 30, 1915.

Application filed January 30, 1914. Serial No. 815,487.

*To all whom it may concern:*

Be it known that I, LUCIEN LINDEN, a subject of the King of the Belgians, and residing at Brussels, Belgium, have invented a new and useful Improved Apparatus for Purifying Sewage or any other Liquid; and I do hereby declare the following to be a full, clear, and exact description of the same.

My present invention relates to an improved apparatus for purifying sewage or any other liquid by decanting and filtration through the layer of residues deposited, which are prevented from being drawn away by the purified liquid.

The improved process is characterized by the fact that the continuously flowing sewage or other liquid to be purified is decanted a first time so that the residues deposited form subsequently a filtering bed through which the liquid to be purified is caused to pass and which retains the solid substances in suspension in said liquid, which after leaving the filter forms within the liquid mass contained in the tank, a current whose velocity decreases toward the exit of the tank so as to prevent mud from being drawn away by the liquid toward the exit.

This improved process is carried into practice in an oblong tank or the like, the bottom of which has its general plane raised gradually toward the exit.

According to this invention, the purifying tank is characterized by the fact that the bottom thereof is formed by a series of pockets, the depth of which decreases gradually toward the exit of the tank, impure water or sewage being admitted above the bottom of the first pocket, into which are deposited the thickest particles of impurities, through which the water flows subsequently, the water flowing downwardly and around the lower edge of a vertical partition into the second pocket, from which it is discharged into the liquid mass contained in the tank, wherein it forms a current which is slightly inclined upwardly toward the exit of the tank and whose speed is decreased gradually because said current passes through gradually increasing openings provided in vertical partitions arranged to separate the different pockets from each other, for the purpose of causing the materials in suspension which become gradually lighter to be deposited in the succeeding pockets before the water reaches the exit of the tank, and for the purpose of preventing any filtering material from being drawn away by the flow of water.

One form of construction of my improved purifying tank is illustrated in the accompanying drawings, wherein—

Figure 1.—is a vertical longitudinal section through the complete tank, Figs. 2 and 3.—show details hereinafter referred to.

The bottom of the tank which is preferably of oblong form, is slightly inclined upwardly toward the exit A of the tank and formed of a series of funnel-shaped pockets 1, 2, 3, 4, 5, 6, the depth of which is gradually decreased toward the exit. The bottom of the first and second pockets 1, 2, which are of larger capacity than the following pockets, is preferably curved, cylindrical or spherical, while the bottom of the pockets 3, 4, 5, 6 is formed of walls inclined toward the center of each pocket. Each pocket is provided with a central downwardly projecting cylindrical extension 7, to which is connected a pipe 8 for the discharge of the solid residues collected in the pocket. Within said cylindrical extensions 7 the mud will be compressed by the weight of the water above the same in such a way that it loses about 50% of its water or liquid. The cylindrical extension 7 of the second collector may be provided with a valve or the like 9, through which the mud collected in said pocket may be discharged directly, say into a wheeled car, running on a track below the tank. In order to facilitate the discharge of mud from said collector 2, if the mud forms a compact lump in the extension 7, I provide vertically above the latter a tubular guide 11, within which a rod 12, the lower end of which is provided with a suitable head 13, may be reciprocated vertically in order to crush the lump of mud and force the same outwardly through the discharge pipe.

Into the first collector 1 is dipped a more or less conical ball-shaped hood 14, the upper tubular end of which is connected to the water inlet pipe 15. Arranged in the vertical center of said hood is a vertical pipe 16, through which suitable sterilizing substances may be introduced and uniformly distributed into the solid residues collected upon the bottom of the collector 1, in order to kill the micro-organisms contained in the residues and avoid the decay thereof.

The collectors 1, 2 are separated from each other by a partition 17, extending from the bottom upwardly to a certain height, while the collectors 2, 3, 4, 5, 6 are separated from each other by vertical partitions 18, extending from the common wall between two adjacent collectors upwardly to the upper rim of the tank. Arranged in said partitions are openings 19, the area of which is gradually increased toward the exit and the centers of which are located on a straight line, which is slightly inclined upwardly toward the exit A.

The collector 2 is divided into two unequal communicating compartments by a vertical partition 20, which forces the water discharged from the collector 1 to pass downwardly across the bottom of the collector 2, that is through the mud deposited upon said bottom. Each of the following collectors has a vertical partition 21, serving to lead the particles of mud descending in said collectors toward the bottom of the latter and to avoid any whirling of the liquid in these collectors. Arranged in front of the exit A is another partition 22 serving to avoid any movement of the upper liquid layers in the last collector 6.

The collector 2 is connected on one hand by means of an outer valved pipe 23 to the collector 1, and on the other hand by means of a similar pipe 24 to the collector 3. Through these two pipes a portion of the residues collected in the pockets 1, 3 may be conducted into the pocket 2, should the latter not contain a sufficient quantity of residue.

The improved purifying tank operates as follows:—The impure water or sewage fed through the pipe 15, flows downwardly through the hood 14 toward the bottom of the collector 1 where the heaviest materials are deposited, whereupon the water flows upwardly all around the hood through the mud deposited in order to be coarsely filtered. Now the water is discharged into the collector 2, wherein it is forced by the partition 20 to flow toward and across the bottom, upon which lighter particles of mud will be deposited, said particles of mud forming a filtering bed after a certain lapse of time, through which the subsequently admitted water is formed to pass in order to be filtered a second time. Owing to the fact that the width of the two compartments formed in the collector 2 by the partition 20 becomes gradually unequal, the water will be discharged from the collector 2 at much lower speed, so that the greatest part of its mud will be deposited into this collector and into the following collector 3. The water which is now purified to a more or less great extent flows through the openings 19 of the different partitions 18 and successively above the different collectors 3, 4, 5, 6, into which the remaining particles of mud will be deposited. The current of liquid formed within the liquid mass owing to the arrangement of the partitions 18 extending upwardly to the upper rim of the tank, flows toward the exit A at gradually decreasing speed, because the area of the openings 19 is gradually increased toward said exit. Owing to this particular feature the particles of mud in suspension which become gradually lighter, will be enabled to be slowly lowered into the collectors 3, 4, 5, 6, as soon as they meet with the partitions 21 of said collectors, and also because the liquid is nearly immovable in said collectors.

The filtering bed of the collector 2 may be increased by the opening of the valves provided in the connecting pipes 23, 24, or by introducing suitable materials into said collector capable of forming a filter bed with the residue and retaining the light materials in suspension.

The mud deposited in the collectors 1, 2, 3, 4 ... may be sterilized continuously or intermittently by means of suitable sterilizing substances introduced into each collector through vertical pipes such as 16, in order to avoid decay in said mud. The same pipe 16 or another similar pipe may be utilized for introducing carbonic acid into the mass of mud contained in the tank, if lime, limewater or lime-milk as a precipitating means has been added to and thoroughly mixed with the impure water prior to its admission into the hood 14. When the water enters the tank, the precipitation will be complete and the carbonic acid gas introduced as described will transform the lime into carbonate of lime or chalk. The chalk mixed with the filtering mud in the collector 1 and also if necessary in the following collectors 2, 3 ... forms a perfect filtering bed with the residual mud, said filtering bed retaining the materials in suspension in a perfect manner, rendering the filtering bed more compact and preventing the same from being drawn away by the flowing water.

The carbonic acid gas introduced exclusively and directly into the bottom part of the tank, fulfils an active function in this part just at the moment when the chalk becomes useful for the formation of the filtering bed. The carbonic acid gas must be introduced under pressure through the pipe 16, so that said gas must find its way through the entire mass of mud. The mud deposited will be discharged through the pipes 8 as required, while the excess of filtering material may be removed from the collector 2 by means of the device 12, 13.

The water may be further purified and any particle of mud may be retained by causing the current 25 to flow through a filtering fabric of cotton or the like, arranged and cleaned in the following way: As shown in Figs. 2 and 3, an endless band of linen or the like 27 extends around each partition 18 and over rollers 28, so that the current 25 is caused to flow through both leads of the band. Arranged at the lower end of the pocket formed by the endless band is a tray 29 terminating into a pipe extending outwardly and provided with a valve for emptying said tray. Brushes 30 in contact with the upper part of the band, remove the impurities deposited upon said band. These impurities are partly removed by the flowing water. In fact the surface of the band upon which the impurities have been deposited is preferably moved upwardly through the next collector and the impurities are deposited into the latter after being loosened by the water flowing through the band. The filtering band may be sterilized either by chemicals or by boiling water, contained in a suitable trough 31 arranged at the top of each partition 18, the filtering band 27 passing around a roller 28$^a$ dipped into the sterilizing liquid.

Arranged at suitable intervals above the normal level of liquid are transverse trays 26, connected to a collecting tray (not shown). The exit A being completely closed, the level of liquid will be raised in the various collectors until the water flows over the upper rims of the trays 26. The grease, scum and the like collected upon the surface of the liquid is thus discharged into the transverse trays 26 and the collecting tray connected to the latter, so that the water contained in the tank will be deprived from any superficial impurity, the greasy substances being at the same time recovered without expense. The exit A being then opened again, the level of liquid will be lowered below the transverse trays 26 and the operation already described will be continued.

The removal of greasy substances may be repeated according to the requirements.

The number of collectors 1, 2, 3 . . . may be increased or decreased as required or desired without departing from the scope of my invention.

Having fully described my invention, what I claim and desire to secure by Letters Patent is:—

1. Apparatus for cleansing liquids by decantation, including a container for a mass of the liquid, and means for constraining a stream of the liquid to pass with gradual deceleration through and below the surface of a mass of liquid in the container.

2. An apparatus for cleansing liquids by decantation, including a series of adjacent pockets provided with openings connecting the pockets, the openings relatively progressively increasing in area.

3. An apparatus for cleansing liquids by decantation, including a series of adjacent pockets of gradually decreasing depth and provided with openings connecting the pockets, the openings relatively progressively increasing in area.

4. An apparatus for cleansing liquids by decantation, including a series of adjacent pockets of gradually decreasing depth and provided with openings connecting the pockets, the openings relatively progressively increasing in area and progressively decreasing in distance from the top of the pockets and vertical partitions across the lower part of each pocket.

5. An improved tank for purifying water and sewage, comprising in combination a series of funnel-shaped pockets forming the upwardly inclined bottom of the tank and the depth of which is gradually decreased toward the exit of the latter, a suitable inlet in the first (deepest) pocket through which water is admitted into the lower part of the latter, a free communication between the first and second pocket, a vertical partition dividing the second pocket into two unequal compartments and extending from the top of the tank to a point at a certain distance above the bottom of the second pocket, vertical partitions separating the following pockets from each other and extending upwardly to the upper rim of the tank, a suitable opening in each partition for the passage of water from one pocket into another, the area of said openings being gradually increased toward the exit of the tank, means arranged in each pocket for discharging mud therefrom, and means for removing impurities from the upper surface of the water contained in the tank, substantially as set forth.

6. An improved tank for purifying water and sewage, comprising in combination a series of funnel-shaped pockets forming the upwardly inclined bottom of the tank, a suitable inlet through which impure water is admitted into the lower part of the first pocket at one end of the tank, a free communication between the first pocket and the second pocket, a vertical partition dividing the second pocket into two unequal communicating compartments, vertical partitions separating the following pockets from each other and extending upwardly to the upper rim of the tank, suitable openings in said partitions, the area of which is gradually increased toward the exit of the tank and the centers of which are situated on a straight line inclined upwardly toward the exit, suitable filtering devices arranged on opposite sides of said openings, transverse trays arranged just above the normal level of water in the tank, means for introducing sterilizing and precipitating substances into the mass of residues collected in each pocket, and means for discharging residues from the various pockets, substantially as set forth.

7. An improved tank for purifying water and sewage, comprising in combination a series of pockets formed in the upwardly inclined bottom of the tank, means for admitting impure water into the lower part of the first pocket, a free communication between the first pocket and the second pocket, a vertical partition dividing the second pocket into two communicating partitions, vertical partitions separating the following pockets from each other, a suitable opening in each of said partitions and the area of which is gradually increased toward the exit of the tank, a vertical tubular guide extending to a point above the bottom of each pocket, a rod adapted to be reciprocated vertically in said guide, suitable extensions at the lowermost part of the bottom of each pocket in line with said rod and guide, discharge pipes extending from said extensions, suitable valved conducts connecting the second pocket to the first pocket and to the third pocket, and means for automatically removing impurities from the upper surface of the water by closing the exit of the tank, substantially as set forth.

8. An improved tank for purifying water and sewage, comprising in combination a series of pockets formed in the upwardly inclined bottom of the tank, means for admitting impure water into the lower part of the first pocket, means for decanting impure water from the first pocket into the second pocket, means for causing the water discharged into the second pocket to pass down and across the bottom of the second pocket, vertical partitions separating the following pockets from each other and extending upwardly to the upper rim of the tank, a suitable opening in each partition for the passage of water, movable filtering devices extending on opposite sides of said openings upwardly above the upper rim of the vertical partitions, means for automatically cleaning said filtering devices, and means for automatically sterilizing the same, substantially as set forth.

9. An improved tank for purifying water and sewage, comprising in combination a series of pockets formed in the bottom of the tank, means for admitting impure water into the lower part of the first pocket, means for decanting impure water from the first pocket into the second pocket, means for causing the water discharged into the second pocket to pass down and across the bottom of the second pocket, vertical partitions separating the following pockets from each other and extending upwardly to the upper rim of the tank, suitable openings in said partitions arranged to cause the water to flow toward the exit of the tank at a gradually decreasing speed, endless filtering bands, extending around the partitions between the various pockets, guiding rollers for said filtering bands, means for cleaning the same, and means for sterilizing the same, substantially as set forth.

10. An improved tank for purifying impure water and sewage, comprising in combination a series of pockets formed in the upwardly inclined bottom of the tank, means for admitting impure water mixed with lime into the lower part of the first pocket, a suitable decanting partition between the latter and the second pocket, a vertical partition dividing the second pocket into two unequal communicating compartments, means for causing the water discharged from the second pocket to flow upwardly toward the exit of the tank at a gradually decreasing speed, means for introducing carbonic acid gas into the mass of mud collected in the various pockets in order to produce carbonate of lime forming a compact filtering mass with the mud, and means for discharging the solid residues from the various pockets if necessary, substantially as set forth.

In testimony whereof, I have signed my name to this specification in the presence of two subscribing witnesses.

LUCIEN LINDEN.

Witnesses:
 JOSE P. WAGNER,
 FERNAND JOSEPH LABARY.